United States Patent

Farmer et al.

[11] Patent Number: 5,591,094
[45] Date of Patent: Jan. 7, 1997

[54] TENSIONER WITH ADJUSTABLE STOP FOR POWER TRANSMISSION BELT

[75] Inventors: Ian Farmer, Tecumseh; Gregory A. St. Denis, Windsor, both of Canada

[73] Assignee: The Gates Corporation, Denver, Colo.

[21] Appl. No.: 551,506

[22] Filed: Nov. 1, 1995

[51] Int. Cl.⁶ .......................................... F16H 7/14
[52] U.S. Cl. .............................. 474/117; 474/135
[58] Field of Search .......................... 474/117, 133–135

[56] References Cited

U.S. PATENT DOCUMENTS

| | | | |
|---|---|---|---|
| 4,046,023 | 9/1977 | Henle et al. | 474/117 X |
| 4,299,584 | 11/1981 | Sproul | 474/135 |
| 4,351,636 | 9/1982 | Hager | 474/135 |
| 4,504,254 | 3/1985 | Foster | 474/135 X |
| 4,634,407 | 1/1987 | Holtz | 474/112 |
| 4,822,322 | 4/1989 | Martin | 474/135 |
| 4,917,655 | 4/1990 | Martin | 474/117 X |
| 5,045,031 | 9/1991 | Thomey | 474/138 |
| 5,098,347 | 3/1992 | Sajczvk et al. | 474/135 |

*Primary Examiner*—Roger J. Schoeppel
*Attorney, Agent, or Firm*—H. W. Oberg; C. H. Castleman; S. G. Austin

[57] ABSTRACT

A tensioner with a pivot-arm that is free to move toward a belt of a belt drive system to tighten the belt and is also free to move away from the belt a predetermined amount to slacken the belt and adjust belt tension while avoiding tooth jump in extreme torque reversal situations. An adjustable stop is provided to restrict movement of the pivot-arm and inhibit tooth jump as the tensioner pulley moves to slacken the belt.

14 Claims, 2 Drawing Sheets

TENSIONER WITH ADJUSTABLE STOP FOR POWER TRANSMISSION BELT

BACKGROUND OF THE INVENTION

The invention relates to a belt tensioner and a belt tensioning system, but more particularly the invention relates to a spring type tensioner used with a camshaft belt drive system for automotive engine applications.

In an automotive camshaft drive system, a synchronous belt or timing belt is entrained around pulleys including at least two toothed pulleys. One of the pulleys is a crank pulley and the other is one or more camshaft pulleys that induce cyclic torque variations into the drive system. An idler pulley such as a back-side idler pulley is pressed against the belt to effect an installed belt tension. It is common practice in many timing belt drive systems to compromise the amplitude of belt tension variations in a system by means of a fixed idler pulley. An installation belt tension at room temperature is chosen to inhibit the amplitude of the belt tension variations to prevent belt toothed failure and avoid tooth jump (i.e., ratcheting). If the installed belt tension is too low, belt tooth failure and tooth jump can occur. If installation tension is too high, it can introduce shortened belt life and belt noise at engine operating temperatures. A fixed idler pulley must operate over a range of temperature conditions. There is a change in pulley center distance between a cold automotive engine such as usually occurs during engine start up and a warm or thermally expanded engine such as occurs during normal engine operating temperatures. Thus, the thermal effect is to increase belt tension with engine temperature increases and conversely, decrease belt tension with decreases in engine temperature.

It is known to use an automatic tensioner in conjunction with a synchronous or timing belt drive system to compensate or handle tension variations in a belt that are attributable to dynamic effects such as cyclic torque variations or thermal effects such as those that introduce a change in the length of a timing belt drive. The tensioner is located at a normally slack side belt span of a belt in a belt drive system. An example of such spring type, mechanical tensioners for a synchronous belt drive are disclosed in U.S. Pat. Nos. 5,045,031 and 5,098,347. While these tensioners are designed to accommodate cyclic torque variations and thermal effects in a belt drive system by controlling belt tension at a slack side belt span, such tensioners are not designed to accommodate extreme torque reversal situations such as those that can occur during engine backfiring or when an engine is rotated in reverse (e.g. an automobile going backward while in forward gear with the clutch out). In such extreme torque reversal situations, the slack side of the belt drive system becomes the tight side of the belt and vice versa. Tight side belt tension at the belt tensioner causes the tensioner to operate to "kickback" to rapidly decrease belt tension by moving a pulley and its pivot-arm rapidly away from the belt to slacken the tight side belt span. If the pulley movement is extreme, it can over slacken the belt which may result in tooth jump or ratcheting as the slackened belt enters the crank pulley or cam shaft pulleys. Tooth jump or ratcheting is deleterious to the operation of an engine as synchronization of the pulleys is lost.

Some tensioners have a ratchet and pawl mechanism attached to the tensioner's pivot arm to eliminate tensioner "kickback" and avoid tooth jump or ratcheting. U.S. Pat. No. 4,299,584 discloses a ratchet operative with a leaf-spring pawl that allows some compliance at kickback by permitting the leaf-spring to slightly deflect. Another ratchet and pawl mechanism is disclosed in U.S. Pat. No. 4,634,407 where the ratchet mechanism operates as a one-way clutch that fixes the position of a pivot-arm so that the tensioner cannot operate to slacken a belt. A problem with such ratchet/pawl devices is that the tensioner must operate as substantially a fixed idler in one direction as the ratchet mechanism limits the motion of the tensioner pivot-arm. In other words, the tensioner pivot-arm cannot operate in a direction that would allow the belt to be slackened. The problem of belt tooth failure and noise is reintroduced into the belt drive system when a belt cannot be slightly slackened.

SUMMARY OF THE INVENTION

In accordance with the invention, an automatic tensioner is provided that is useful in conjunction with a synchronous (timing) belt drive system to compensate or handle tension variations attributable to torque variations and thermal effects introduced as a change in length of a synchronous belt drive but without the attendant problems associated with a fixed pulley or the problem of tooth jump.

The belt tensioner of the invention is of the mechanical type with an idler pulley rotatably mounted to a pivot-arm and a spring to bias movement of the pivot-arm so there is pressing engagement against a belt of a belt drive system. The pivot-arm is free to move toward the belt to tighten the belt and is also free to move away a predetermined amount from the belt to slacken the belt so as to adjust belt tension while accommodating thermal growth and shrinkage and arm motion due to cyclic torque variations that affect belt tension. An adjustable stop is positioned a spaced distance from the pivot-arm when the pulley is biased in pressing engagement against a static belt. The spacing is predetermined to allow pivot-arm movement in a direction to slacken the belt while also preventing belt teeth from becoming disengaged from a toothed pulley (i.e. tooth jump) when there is kickback from extreme torque reversal situations.

An object of the invention is to provide a spring biased tensioner that is suitable for use in a timing belt drive system and particularly, a drive system where there are thermal and dynamic belt tensioning effects as well as extreme torque reversal spikes such as introduced by a backfiring engine.

These and other objects are advantages of the invention will be apparent after reviewing the drawings and description thereof wherein.

DESCRIPTION OF PREFERRED EMBODIMENTS

Figures 1, 2:
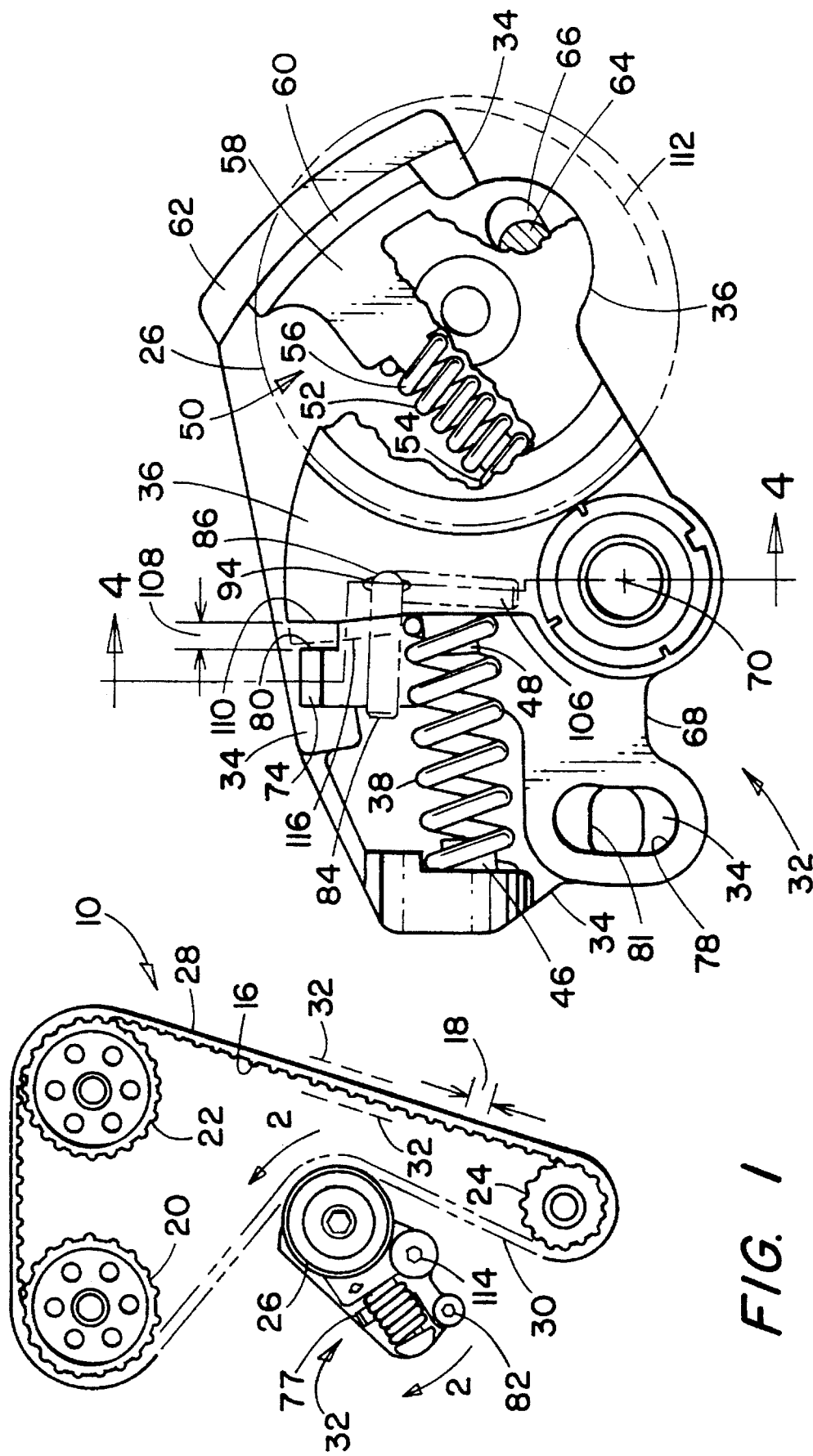
FIG. 1 is a schematic front view of a synchronous (timing) belt drive system of the automotive type which includes a tensioner of the invention.
FIG. 2 is a view taken generally within the line 2—2 of FIG. 1 and showing an enlarged, partially broken away view of a belt tensioner of the invention.

Referring to FIG. 1, a synchronous (timing) belt drive system 10 is shown with a toothed belt 12 with teeth 16 having a height and spaced at a pitch 18 where the belt is entrained and tensioned around toothed pulleys. The illustrated drive system is a camshaft drive of the automotive type that includes two toothed cam pulleys 20, 22, a crank pulley 24 and a tensioning pulley 26.

As an automotive drive system, the pulleys operate over a range of frequencies following the operating RPM of the automotive engine during which the camshaft pulleys introduce cyclic torque variations into the drive. While some cyclic torque variations may be introduced at the crank pulley due to piston strokes of the engine, they are substantially minor in comparison to those introduced by the camshaft pulleys. However, torque variations introduced into the belt are reflected at the driver pulley where operating conditions for belt teeth are most difficult due to the small diameter of the crank shaft pulley and small number of teeth in mesh therewith. The variations in torque contribute to exciting forces that introduce amplitudes of belt tension variations over the range of operation frequencies in spans 28–30 of the belt. There are thermal growth changes in an automotive engine that have an effect on belt tension which are in addition to those attributable to dynamic tension variations. A tensioner 32 of the invention compensates for thermal and dynamic belt tension variations as is known and explained in U.S. Pat. No. 5,098,347. In extreme torque reversal situations that can cause tensioner kickback such as when an engine backfires or when a non-running engine is turned backwards (e.g. car in forward gear rolling backward with clutch out). At extreme torque reversal, the normally tight side belt span 28 becomes slack permitting some lateral belt movement 32 the normally slack side belt span 30 becomes taut causing the tensioner arm to move to slacken the belt. In the case of the prior art tensioners of U.S. Pat. Nos. 5,045,031 and 5,098,347, the tensioner may kickback during extreme torque reversals to such an extent that it is possible to have belt tooth jump at usually the crank pulley. The tensioners of U.S. Pat. Nos. 4,299,584 and 4,634,407, are not free to accommodate normal cyclic torque variations because the pivot-arms are not free to rotate to slacken a belt due to the ratchet and pawl mechanisms; the tensioners operate with the attendant problems of a fixed idler pulley as previously discussed.

Figure 4:
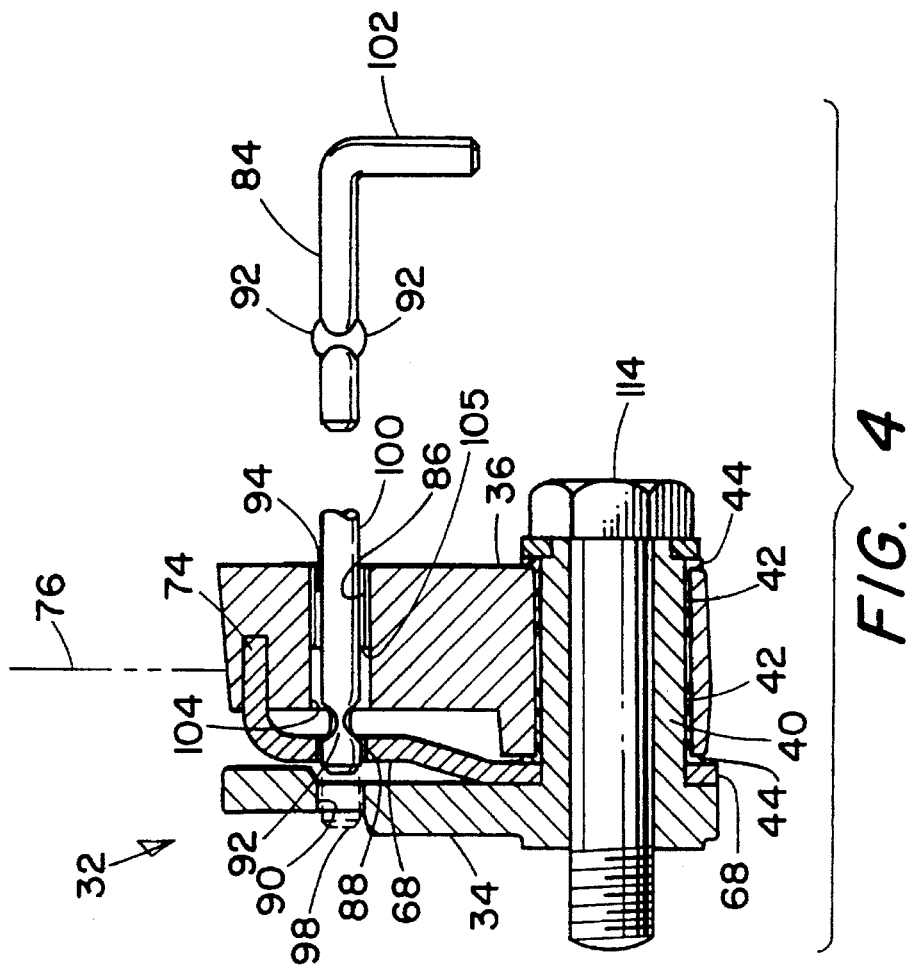
FIG. 4 is a view taken along the broken line for 4—4 of FIG. 2.
Figure 3:
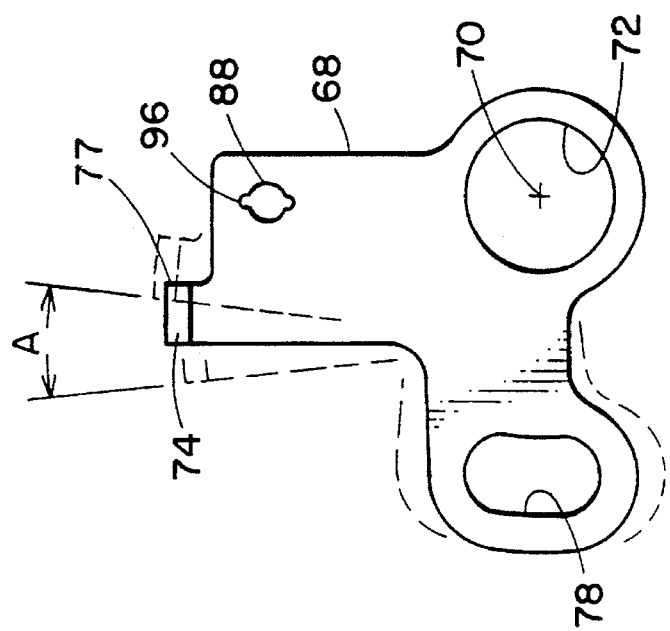
FIG. 3 is a plan view of a component part of the tensioner of FIG. 2 with dashed lines showing movement.

Referring to FIGS. 2–4, a belt tensioner 32 of the invention includes a support structure 34, a first pivot-arm 36 and a spring 38 biased between the support structure and first pivot-arm. The first pivot-arm is mounted to the support structure by means of a pivot 40 in the shape of a cylinder formed of the support structure 34, and one or more optional self-lubricating polymeric sleeve-type bearing 42 that may include a thrust flange 44.

The pulley 26 is rotatably mounted to the pivot-arm such as by means of a roller bearing, not shown.

The spring, which may be in the form of a compression spring, is inter-positioned between a post 46 of the support structure and a post 48 of the first pivot-arm. The spring operates to rotate the pivot-arm and bias the pulley in pressing engagement against the belt. The location of the pulley is shown in phantom in FIG. 2 to expose a damping means 50 for inhibiting movement of the first pivot-arm and hence, the pulley against the belt when the tensioner is in use.

Referring to FIG. 2, the damping means is located underside the pivot-arm and includes a damping spring 52 with one end 54 attached to the pivot-arm and an opposite end 56 attached to a damper structure 58 that includes a shoe 60 of a friction material such as a plastic. The shoe 60 is pressed into sliding surface contact with a cylindrically shaped projection 62 formed of the support structure 34. The damper structure is positioned against the projection 62 by means of the damping spring and a pin 64 formed of the first pivot-arm 36. The pin 64 protrudes into an elongate slot 66 formed in the damper structure. Consequently, the damper structure rotates with the pivot-arm such that the shoe 60 reciprocally slides against the cylindrically shaped projection 62 to effect damping of reciprocal movements of the first pivot-arm.

Referring to FIG. 2, and more particularly, FIGS. 3 and 4, the tensioner 32 of the invention has a second pivot-arm 68 that is coaxial with the first pivot-arm about the pivot-pin 40 axis 70. The second pivot-arm has a bore 72 that is sized to fit over the pivot-pin allowing the second pivot-arm to have substantially the same angular movements as the first pivot-arm. Optionally, but preferably, the second pivot-arm is disposed between the support structure 34 and the first pivot-arm 36 and includes a portion 74 that lies in an arcuate plane 76 of the first pivot-arm and defines a stop 77. The second pivot-arm may be made of a suitable material. When plate material is used, the portion 74 may be in the form of a tab bent 90° to the plane of the rotation of the second pivot-arm.

A slot 78 formed in the second pivot arm and oriented substantially circumferentially relative to the pivot-pin axis 70, overlies a slot 81 formed of the support structure 32. The slots 78, 81 are oriented transverse to each other and each has a width that is sized to receive a fastener such as a bolt 82. The slot 78 permits the second pivot-arm to be slightly rotated about the pivot-pin axis 70 to adjust the position of the stop 77.

A removable latch 84 that may be in the form of a pin attaches the first pivot-arm and second pivot-arm together. The latch includes a bore 86 formed in the first pivot-arm and aligned with a bore 88 formed in the second pivot-arm. Optionally, but preferably, the latch also includes a bore 90 formed in the base structure that is aligned with the bores 86, 88 of the first and second pivot-arms. The latch 84 may include teeth 92 sized to fit within a keyway 94 formed in the first pivot-arm and a keyway 96 formed in the second pivot-arm.

When fully in place, the latch 84 extends through bores 86, 88, 90 to a position 98 as indicated by the dotted line. Three component parts are locked together by the latch whereby the first and second pivot-arms cannot be rotated relative to the support structure. The latch 84 may be partially retracted to a position 100 where it is removed from its position 98 in the bore 90 formed of the base, but is retained in the partially retracted position 100 in the bores 86, 88 of the first and second pivot-arms. In the partially retracted position 100, the first and second pivot-arms are locked together whereby an arcuate movement of the first pivot-arm results in a corresponding arcuate movement A of the second pivot-arm. The first pivot-arm is free to move independently of the second pivot-arm when the latch 84 is fully removed 102.

The latch 84 is moved to selected and controlled positions relative to the support structure, second pivot-arm, and first pivot-arm with the aid of the position of the latch teeth 92 relative to the keyway 94. For example and as shown in FIG. 2, when the latch is in a horizontal position, the teeth 92 of the latch are 90° relative to the keyway 94. A counter bore 104 permits the latch 84 to be rotated. Because of the shoulder 105 formed by the counter bore 104, the latch 84 cannot be fully withdrawn until the teeth 92 are in alignment with the keyway 94 such as when the key is positioned to a vertical position 106 as shown in FIG. 2.

The location of bore 90 formed in the base structure is located in such a manner to position the pivot-arm with its attached pulley, into a retracted position where the spring 38 is compressed. Preferably, the tensioner is manufactured and the latch in place as a shipping member that retains the pivot-arm and pulley in a retracted position for ease of installing the tensioner as part of an automotive engine belt drive system.

The bores 86, 88 of the first and second pivot-arms are located so as to position the stop 77 a predetermined angle or predetermined arcuate distance 108 from the first pivot-arm in the arcuate plane 76. The arcuate spacing between the first pivot-arm and stop corresponds to an arcuate displacement of the pulley in the belt slackening direction where the pulley displacement is less than that which allows the belt teeth from becoming disengaged (i.e. tooth jump) from one of the toothed pulleys as the belt is slackened. Optionally, the arcuate spacing allows a pulley displacement 112 at the belt in the slackening direction that is less than the height of the belt teeth and more preferably, no greater than 0.75 of the height of the belt teeth.

USE

Preferably, the tensioner 32 of the invention is shipped to an automotive manufacturer with the latch 84 installed so that the latch extends through the first pivot-arm, second pivot-arm and support structure and to the full latch position 98 as shown in FIG. 4. In the full latch position, spring 38 is compressed by the first pivot-arm and the pulley is at a retracted position 110 as shown in FIG. 2. The retracted position is where the tensioning pulley provides clearance for installing a timing belt around pulleys of an automotive engine camshaft drive.

Referring to FIGS. 1 and 4, the tensioner 32 is located adjacent its installed position to an automotive engine and a fastener such as a bolt 114 loosely installed. Another fastener such as the bolt 82 is installed which together with bolt 114 aligns the tensioner in its correct position on the engine. Toothed belt 12 is entrained around cam pulleys 20, 22, tensioner pulley 23, and crank pulley 24. Latch 84 is rotated from its horizontal position to a vertical position 106 and pulled to its partially retracted position 100 as shown in FIG. 4. With the latch or pin partially retracted, spring 38 is free to rotate the first pivot-arm 26 moving pulley 23 from its retracted position 110 to its belt engaging position as shown in FIG. 2. The toothed belt 12 is tensioned as the pulley is positioned in pressing engagement against the belt.

The second pivot-arm 68 is rotated about pivot axis 70 to the same angular amount as the first pivot-arm where the tensioner pulley 23 is in pressing engagement against the belt. This co-rotation of the second pivot-arm precisely locates and positions the stop at the predetermined angle or arcuate displacement 108 from the first pivot-arm. Bolts 82 and 114 are tightened to secure the tensioner and lock the second pivot-arm and thereby, the stop 77 in place. Latch 84 is removed from the tensioner and discarded leaving stop 77 at the predetermined arcuate distance or angle from the first pivot-arm. For example, the stop may be positioned 2.50° from the installation of the first pivot- arm so as to accommodate a 1.35° pivot-arm movement for thermal expansion and a 1.15° pivot-arm movement for cyclic torque variations with a 9.525 mm pitch belt with belt teeth 3.44 mm high.

As installed, the pulley is free to move to tighten and slacken the timing belt and accommodate belt tension changes associated with a change in pulley center distance between a cold and hot automotive engine, and the dynamic effects associated with normal cyclic torque variations of the engine. In extreme torque reversal situations, the first pivot-arm is restricted in movement 116 as the pivot-arm abuts the stop 77. The pulley is restricted by the stop from moving to a position that over-slackens the belt when the pivot-arm abuts the stop. Tooth jump at the crank pulley or other toothed pulleys is advantageously avoided while permitting the pulley of the tensioner to reciprocate within controlled limits to tension the belt.

What is claimed is:

1. A tensioner for tensioning a synchronous power transmission belt with belt teeth having height and spaced at a pitch for engaging toothed pulleys, the tensioner of the type with a pivot-arm mounted with a pivot-pin to a support structure, a pulley rotatably mounted to the pivot-arm for engaging the power transmission belt, and a spring between the support structure and the pivot-arm for rotating the pivot-arm and biasing the pulley in pressing engagement against the belt wherein the improvement comprises:

an adjustable stop means spaced a predetermined distance from a rotated pivot-arm position where the pulley is statically biased in pressing engagement against a belt, the stop means for 1) allowing counter rotation of the pivot-arm and 2) stopping the pivot-arm from counter rotation beyond a predetermined angle.

2. The tensioner as claimed in claim 1 wherein counter rotation of the pivot-arm to a stopped position results in an arcuate pulley displacement that is no greater than the height of the belt teeth.

3. The tensioner as claimed in claim 2 where the arcuate pulley displacement at the stopped position is less than an amount that permits the belt from being disengaged from the toothed pulleys.

4. A tensioner for tensioning a synchronous power transmission belt with belt teeth having height and spaced at a pitch for engaging toothed pulleys, the tensioner of the type with a first pivot-arm mounted with a pivot-pin to a support structure, a pulley rotatably mounted to the first pivot-arm for engaging the power transmission belt, and a spring between the support structure and the first pivot-arm for rotating the first pivot-arm and biasing the pulley in pressing engagement against the belt wherein the improvement comprises:

a second pivot-arm coaxial with the first pivot-arm about a pivot-pin axis and including a portion lying in an arcuate plane of the first pivot-arm and defining a stop; and a removable latch attaching the first pivot-arm and second pivot-arm together whereby an arcuate movement of the first pivot-arm results in a corresponding arcuate movement of the second pivot-arm.

5. The tensioner as claimed in claim 4 wherein the latch holds the second pivot-arm at a predetermined angle from the first pivot-arm so that the stop is positioned in the arcuate plane a predetermined distance from the first pivot-arm.

6. The tensioner as claimed in claim 5 wherein the removable latch includes the first pivot-arm and second pivot-arm each having a bore substantially parallel to an axis of the pivot-pin and a removable pin sized to fit and disposed in said bores.

7. The tensioner as claimed in claim 6 wherein the bores include keyways and the pin includes at least one tooth sized for one-way axial movement in the keyways.

8. The tensioner as claimed in claim 6 and further including a bore in the support structure and wherein the removable pin is sized to fit and be disposed in the support structure bore.

9. The tensioner as claimed in claim 5 wherein the distance between the first pivot-arm and stop corresponds to an arcuate displacement of the pulley in a belt slackening direction where the displacement is less than that which allows the belt teeth from becoming disengaged with a toothed pulley.

10. The tensioner as claimed in claim 9 wherein the arcuate displacement of the pulley is no greater than substantially the height of the belt teeth.

11. The tensioner as claimed in claim 4 and further including a fastener between the support structure and second pivot-arm which prevents angular movement of the second pivot-arm about the pivot-pin axis.

12. A drive system of the type with a synchronous power transmission belt with belt teeth having height, the belt entrained around and engaging at least two toothed pulleys, the belt tensioned by a tensioner of the type with a first pivot-arm mounted with a pivot-pin to a support structure, a pulley rotatably mounted to the first pivot-arm for engaging the power transmission belt, and a spring between the support structure and the first pivot-arm for rotating the first pivot-arm and biasing the pulley in pressing engagement against the belt to tension the belt and permitting counter rotation of the first pivot-arm to move the pulley to slacken the belt, wherein the improvement comprises:

an adjustable second pivot-arm coaxial with the first pivot-arm about a pivot-pin axis and including a portion lying in an arcuate plane of the first pivot-arm and defining a stop wherein the stop is positioned and locked a predetermined arcuate spacing from the first pivot-arm to allow pulley displacement in a direction that slackens the belt.

13. The tensioner as claimed in claim 12 wherein the arcuate spacing between the first pivot-arm and stop corresponds to an arcuate displacement of the pulley in the belt slackening direction where the pulley displacement is less than that which allows the belt teeth from becoming disengaged from one of the toothed pulleys as the belt is slackened.

14. The tensioner as claimed in claim 13 wherein the arcuate displacement is no greater than the height of the belt teeth.

* * * * *